(12) United States Patent
Zhou et al.

(10) Patent No.: US 10,436,480 B2
(45) Date of Patent: Oct. 8, 2019

(54) THERMALLY DRIVEN ENVIRONMENTAL CONTROL UNIT

(71) Applicant: Applied Research Associates, Inc., Albuquerque, NM (US)

(72) Inventors: Gong Zhou, Panama City, FL (US); Aly H Shaaban, Panama City, FL (US)

(*) Notice: Subject to any disclaimer, the term of this patent is extended or adjusted under 35 U.S.C. 154(b) by 477 days.

(21) Appl. No.: 14/811,502

(22) Filed: Jul. 28, 2015

(65) Prior Publication Data

US 2016/0033176 A1  Feb. 4, 2016

Related U.S. Application Data

(60) Provisional application No. 62/030,120, filed on Jul. 29, 2014.

(51) Int. Cl.
*F25B 15/02* (2006.01)
*F25B 27/02* (2006.01)

(52) U.S. Cl.
CPC .............. *F25B 15/02* (2013.01); *F25B 27/02* (2013.01); *Y02A 30/274* (2018.01); *Y02A 30/277* (2018.01); *Y02B 30/62* (2013.01)

(58) Field of Classification Search
CPC . F25B 27/02; Y02B 30/62; C09K 5/00; F25D 5/00
See application file for complete search history.

(56) References Cited

U.S. PATENT DOCUMENTS

| | | | |
|---|---|---|---|
| 2,089,467 A | 1/1934 | Chamberlain |
| 3,780,537 A | 12/1973 | Spencer |
| 4,094,357 A | 6/1978 | Sgroi |
| 4,240,436 A | 12/1980 | Singleton |
| 4,248,291 A | 2/1981 | Jarmul |
| 4,377,160 A | 3/1983 | Romaine |
| 4,404,820 A | 9/1983 | Romaine |
| 4,462,224 A | 7/1984 | Dunshee et al. |
| 4,596,250 A | 6/1986 | Beisang, III et al. |
| 4,671,267 A | 6/1987 | Stout |
| 4,783,866 A | 11/1988 | Simmons et al. |

(Continued)

*Primary Examiner* — Edward F Landrum
*Assistant Examiner* — Melodee Jefferson
(74) *Attorney, Agent, or Firm* — Dinsmore & Shohl LLP; Monika L'Orsa Jaensson; Bryan Walker

(57) ABSTRACT

The present invention regards a thermally driven, environmental control unit including, in a closed fluid-flow, non-pressurized circuit, a mixing heat exchanger, a heat recovery unit, a fractionator/evaporator, and one or more condensers. The system is designed to include at least one solute and a solvent, selected so that the mixture of each solute and the solvent produce an enthalpy change of between about 5 to 30 kJ/mol for cooling and −10 to −200 kJ/mol for heating. A plurality of pumps are integrated into the system to move the solute and the solvent, and a mixture thereof, among the various components of the present invention. The unit further includes a liquid loop coupled with the mixing heat exchanger and an air handler to provide warm or cool supply air. The present invention further regards a process for cooling or heating air using enthalpy change of solution associated with the dissolution of a solute in a solvent, at relatively constant atmospheric pressure, and separation of the solute from the solvent for re-use in the process.

8 Claims, 2 Drawing Sheets

(56) References Cited

U.S. PATENT DOCUMENTS

| | | | |
|---|---|---|---|
| 4,848,088 A * | 7/1989 | Lazarevich | B01D 3/007 165/104.12 |
| 4,858,259 A | 8/1989 | Simmons et al. | |
| 4,887,326 A | 12/1989 | O'Brien et al. | |
| 4,964,402 A | 10/1990 | Grim et al. | |
| 4,967,573 A | 11/1990 | Wilhelm | |
| 5,088,487 A | 2/1992 | Turner | |
| 5,111,810 A | 5/1992 | Fortney | |
| 5,274,865 A | 1/1994 | Takehashi | |
| 5,314,005 A | 5/1994 | Dobry | |
| 5,417,276 A | 5/1995 | Dobry | |
| 5,431,622 A | 7/1995 | Pyrozyk et al. | |
| 5,441,534 A | 8/1995 | MacWinnie et al. | |
| 5,449,379 A | 9/1995 | Hadtke | |
| 5,514,170 A | 5/1996 | Mauch | |
| 5,723,002 A | 3/1998 | Delk et al. | |
| 5,776,177 A | 7/1998 | MacWhinnie et al. | |
| 6,261,313 B1 | 7/2001 | MacWhinnie et al. | |
| 6,438,965 B1 | 8/2002 | Liao | |
| 7,065,893 B2 | 6/2006 | Trinh et al. | |
| 7,096,687 B2 | 8/2006 | Trinh et al. | |
| 7,197,893 B2 | 4/2007 | Trinh et al. | |
| 7,243,509 B2 | 7/2007 | Trinh et al. | |
| 7,784,304 B2 | 8/2010 | Trinh et al. | |
| 2005/0092682 A1 * | 5/2005 | Phillips | C10G 1/04 210/634 |
| 2007/0270925 A1 | 11/2007 | Levinson | |
| 2009/0166175 A1 * | 7/2009 | Waibel | B01D 3/007 203/49 |
| 2009/0272134 A1 * | 11/2009 | Hulse | C09K 5/047 62/112 |
| 2012/0073315 A1 * | 3/2012 | Stuerzebecher | F25B 15/04 62/101 |
| 2012/0298332 A1 * | 11/2012 | Petters | F28D 21/0015 165/104.11 |
| 2013/0038055 A1 * | 2/2013 | Ostrom | F01K 25/065 290/2 |

* cited by examiner

THERMALLY DRIVEN ENVIRONMENTAL CONTROL UNIT

BACKGROUND OF THE INVENTION

The present invention regards a system and a process for efficient cooling and/or heating that is capable of using multiple sources of thermal energy, including waste heat, renewable thermal energy, and fuel combustion. The process produces cooling by mixing a solute with a solvent that produces a positive enthalpy change, and produces heating by mixing a solute with a solvent that produces a negative enthalpy change. In both cases, the solute is then separated from the solvent using thermal energy, and the cooling/heating process is repeated in a continuous fashion.

Thermally driven cooling and heating systems presently available on the market include absorption, adsorption, and ejector-compressor systems. These systems tend to be large and bulky, and require many hydraulic loops and auxiliary components, resulting in systems that require significant amounts of energy to effectively change the temperature of a space.

For example, a simple absorption refrigeration system utilizes a gas-liquid mixture which forms a solution due to the strong affinity between the two fluids; the gas-rich solution is then pumped to a high-pressure zone, where the mixture is heated by a generator. Vapors of refrigerant generated in this pressurized heating process are sent towards the traditional refrigeration cycle of a condenser, an expansion valve and an evaporator, wherein the temperature is reduced by the evaporation of refrigerant in the evaporator, at low pressures. The now gas-poor solution turns over in the absorber by passing through a pressure-relief valve, and absorbs the vapors of refrigerant, allowing the cycle to begin again. The system requires multiple auxiliary components to handle its hydraulic design, and high electrical demands to handle the pressurized portions of the system.

The adsorption system operates on the principle of physical adsorption between the refrigerant and an adsorbent (liquid or solid). The molecules of the refrigerant come to be fixed at the surface of the adsorbent via van der Waals forces. The system generally consists of a generator, a condenser, a pressure-relief valve and an evaporator. Adsorption systems are limited, however, due to the weak mass and heat transfer characteristics of the adsorbent beds. Specifically, the adsorbents, such as activated carbon, zeolite or silica gel, have low thermal conductivities and poor porosity characteristics. Consequently, the system typically has a bulky collector/generator/adsorber component which requires excessive heating capacity, leading to a rather low thermal coefficient of performance (COP).

Ejector-compressor systems have become a topic of interest for research in recent years, because they are heat-operated by low grade energy sources such as solar energy and industrial waste heat. These systems can be satisfactorily operated at generator temperatures as low as 65° C. However, similar to the absorption system, they require many hydraulic loops and high auxiliary electricity loads.

The present invention relates to a unique use of enthalpy change of solution for cooling and heating applications, using liquid binary mixtures as the working fluids (refrigerant/heater). The system has a simple hydraulic design and a low electrical demand to operate its recirculation pumps.

Using these liquid binary mixtures, when a solute is mixed in a solvent resulting in a positive enthalpy change, the mixing process is described as endothermic, while a negative enthalpy change signifies an exothermic process. In endothermic processes, the solution absorbs energy in the form of heat from the surroundings, lowering the temperature of the surrounding area. For example, instant ice packs use an endothermic reaction of ammonium nitrate ($NH_4NO_3$) in water to achieve rapid cool temperatures ($\Delta H_{sol}$=+25.7 kJ/mol). In exothermic processes, when the enthalpy change is negative, the solution rejects heat to the surroundings, raising the temperature of the surrounding area. For example, instant hot packs use an exothermic process of magnesium sulfate ($MgSO_4$) mixing in water, resulting in an enthalpy change of $\Delta H_{sol}$=−1,278.12 kJ/mol. These two examples of endothermic and exothermic processes are one-time use devices.

The present invention takes advantage of the endothermic and/or exothermic processes of certain solute/solvent combinations to modify the temperature of a space, using a continuously operating device by repeating the process of mixing and separating the solute and the solvent, allowing the process to continue without having to replace the solute or the solvent.

GENERAL DESCRIPTION OF THE INVENTION

Cooling and/or heating systems of the present invention include (i) a binary mixture of a solute and a solvent which acts as a coolant or heating medium, (ii) a cooling or heating heat exchanger, with mixture storage capacity, (iii) a fractionator/evaporator column for separating the mixing solute and the solvent, (iv) a condenser, (v) one or more heat recovery heat exchangers, and (vi) heat input from one or more heat sources. Pumps are used throughout the system to move solute, solvent, and the binary mixture thereof, through the system, as hereinafter described.

The design of the system may vary based upon whether the system is intended to heat or cool an environment, or both; however, the simplicity of the design and the lack of a pressurized loop allow for simple environmental control units, and efficient overall heating or cooling systems. Integral to the design of the system is the selection of the solute and the solvent, which should be selected (1) to generate an effective enthalpy change in solution through the mixing process, and (2) with different boiling points, so that the solvent and solute may be easily separated for re-use.

The present invention also includes a method for changing the temperature of a liquid within an air handler, by providing a mixing heat exchanger and a coil supported within the central compartment of each of the mixing heat exchanger and the air handler. Liquid cycled through the coils is cooled or heated in the mixing heat exchanger when a solute is mixed with a solvent in the heat exchanger. As with the system of the present invention, the solute and the solvent are selected to produce either an exothermic or an endothermic reaction when mixed. After the heat exchange from the mixture of the solute and the solvent in the mixing heat exchanger dissipates, the solute/solvent mixture is removed from the mixing heat exchanger, and the solute is separated from the solvent for use in another cycle of the method of the present invention.

DETAILED DESCRIPTION OF THE INVENTION

Figure 1:
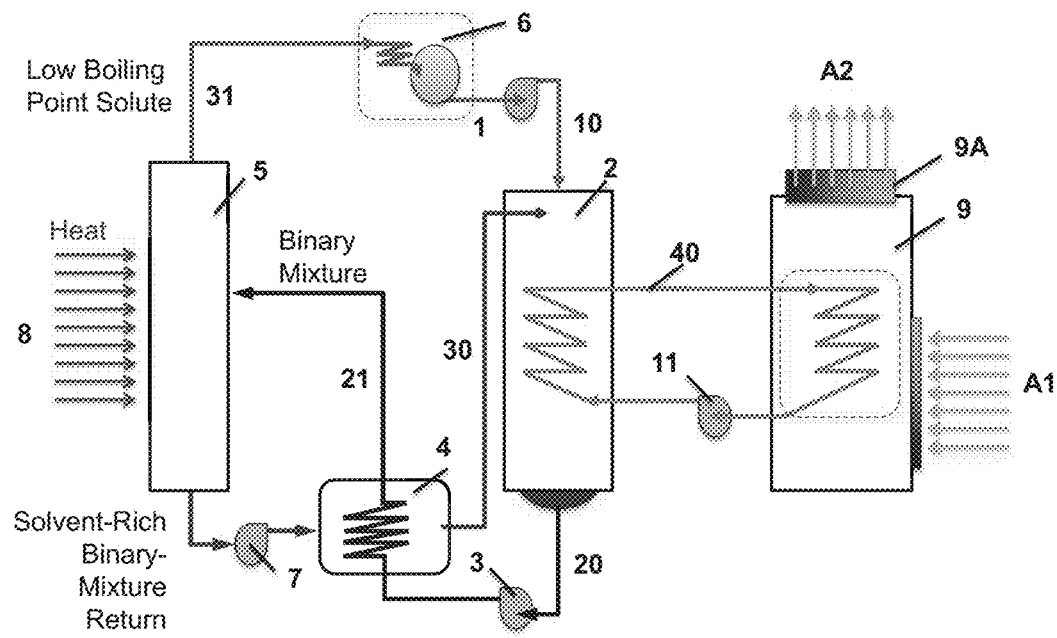
FIG. 1 is a schematic representation of an embodiment of the system of the present invention, used for cooling an environment.

In one embodiment of the invention of the present system (shown in FIG. 1) the system is designed to provide cooling to an environment, in another embodiment of the invention (shown in FIG. 2) the system is designed to provide heating to an environment, and in a third embodiment of the invention (shown in FIG. 3) the system is designed to selectively provide cooling or heating to an environment.

As hereinabove described and shown in FIGS. 1, 2 and 3, the system of the present invention generally includes, in a closed loop, non-pressurized flow cycle, a mixing heat exchanger 2, a heat recovery unit 4, a fractionator/evaporator column 5 for separating the solute and the solvent, such as a fractionator, and a condenser 6. A liquid loop 40 is coupled with both the mixing heat exchanger 2 and an air handler 9, to provide warm or cool supply air. When the system is used to heat an environment, the condenser 6 is incorporated within the air handler 9; when the system is used for cooling, the condenser 6 is placed apart from the air handler 9; and when the system is used as a heat pump, to selectively supply warm and cold air, one condenser 6-2 is placed in the air handler 9, and a second condenser 6-1 is placed apart from the air handler.

In the cooling embodiment of the present invention shown in FIG. 1 The mixing heat exchanger 2 mixes the solvent (received from the fractionator/evaporator column 5) with the solute (pumped from the condenser 6 by means of line 10) producing an endothermic demand, absorbing heat from the liquid in the liquid loop 40, resulting in a chilled liquid that is returned by means of the liquid loop 40 to the air handler 9. In this embodiment the solvent and solute are selected to produce the endothermic reaction of sufficient enthalpy change to chill the liquid in the liquid loop.

The used binary mixture is then pumped from the mixing heat exchanger 2 to the heat recovery unit 4, by means of line 20, and to the fractionator/evaporator column 5, by means of line 21. The fractionator/evaporator column 5 is coupled with a heat source 8, providing heat to the fractionator/evaporator column 5 at temperatures higher than the boiling point of the solute but lower than the boiling point of the solvent, to separate the solute from the solution. The fractionator/evaporator column 5 may be single stage or multiple stages to achieve a high degree of solute separation, producing a solvent-rich return mixture and a solute vapor; the heat source may be controlled by a control unit to maintain the fractionator/evaporator column 5 at the appropriate operating temperature in view of the specific solute and solvent binary mixture.

The solvent rich mixture resulting from the separation process is then pumped back to the mixing heat exchanger 2 by means of lines 30 and 10 for re-use, exchanging heat with used binary mixture across the heat recovery unit 4. Meanwhile, the solute vapor from the fractionator/evaporator column 5 flows to the condenser 6, by means of line 31, where it condenses by rejecting heat to the environment. The condensate solute is then pumped to the mixing heat exchanger 2 as needed. This cycle is repeated to provide a continuous chilled liquid to the air handler 9. When the system is idle, the condensed solute may be stored in the condenser 6 until required for use by the mixing heat exchanger 2. In this arrangement the condenser 6 acts as a suction reservoir for the pump 1.

The heat source 8 may be waste heat, solar heat, electric heat, or fuel combustion heat. A fuel combustion source can be liquid fuels such as diesel, or gas such as natural gas. Each heating device is designed specifically for the heat source selected. If renewable energy is used, the heating source may combine the renewable source with an electric or fuel combustion unit.

The air handler 9, which generally includes a fan 9A to move return air from the room or environment and supply air back into the room or environment, receives the chilled liquid in the liquid loop 40 from the mixing heat exchanger 2, which chilled liquid exchanges heat with the returned room air A1 as the air passes over the loop, supplying cool air A2 back into the room. The liquid loop 40 may be coiled or otherwise structured within either or both of the mixing heat exchanger 2 and the air handler 9, to maximize the amount of liquid subjected to the solute/solvent reaction in the mixing heat exchanger 2, and the amount of chilled or heated liquid provided within the air handler 9; a pump 11 pumps liquid through the liquid loop 40. In this embodiment the solvent and solute are selected to produce the endothermic reaction of sufficient enthalpy change to cool the liquid in the liquid loop.

Figure 2:
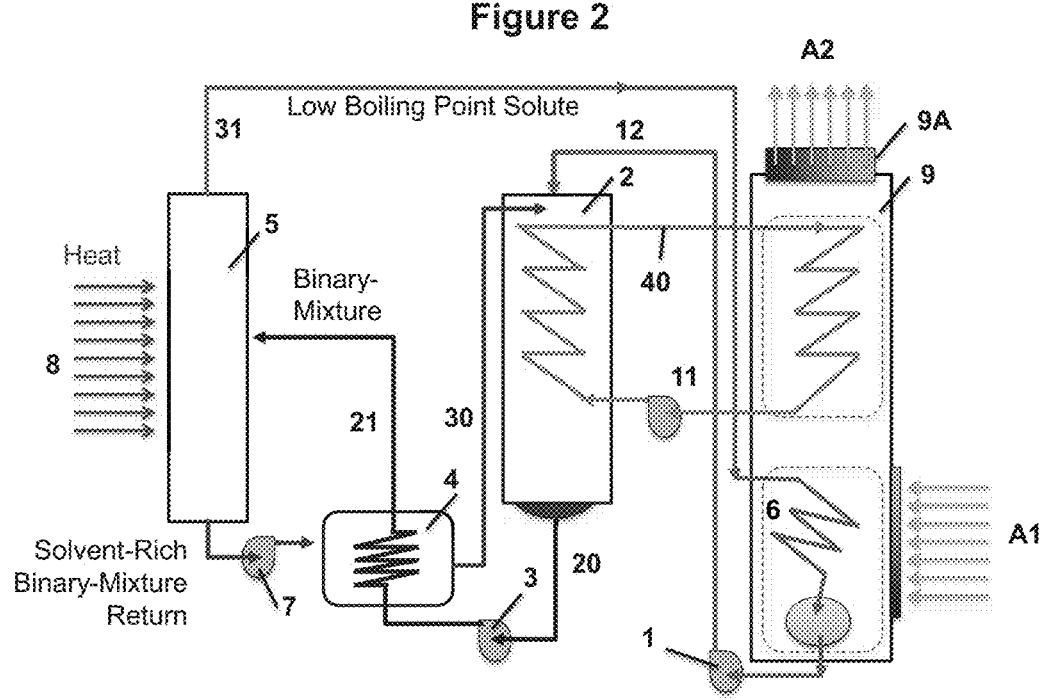
FIG. 2 is a schematic representation of an embodiment of the system of the present invention, used for heating an environment.

The heating embodiment shown in FIG. 2 is similar to the cooling embodiment of FIG. 1 described above, except that the condenser 6 may be housed in the air handler 9 to cause heat recovered from the solute vapor during condensation in the condenser 6 to supplement heating of the return room air A1 in the air handler, resulting in warm air A2 being supplied back into the room. In this embodiment, the solute and solvent are selected to give a negative enthalpy change when mixed. Therefore, the mixing heat exchanger 2 mixes the solute into the solvent producing an exothermic process, providing heating by expelling heat to the liquid in the liquid loop 40, resulting in a heated liquid that is returned by means of the liquid loop 40 to the air handler 9. The solvent and solute are selected to have sufficient enthalpy change during the mixing process to heat the liquid in the liquid loop.

Pumps 1, 3 and 7 are incorporated into the system to deliver solute from the condenser 6 to the mixing heat exchanger 2 (shown as pump 1, delivering the solute by means of line 12); to deliver the solute-solvent mixture from the mixing heat exchanger 2 to the heat recovery unit 4 and the fractionator/evaporator column 5 (shown as pump 3, delivering dissolved solute in solution by means of line 20); and to deliver the solvent-rich binary mixture from the fractionator/evaporator column 5 to the heat recovery unit 4 and back to the mixing heat exchanger 2 (shown as pump 7, delivering the solvent-rich binary mixture by means of line 30). Pump 11 is used to circulate the liquid in the liquid loop 40.

Figure 3:
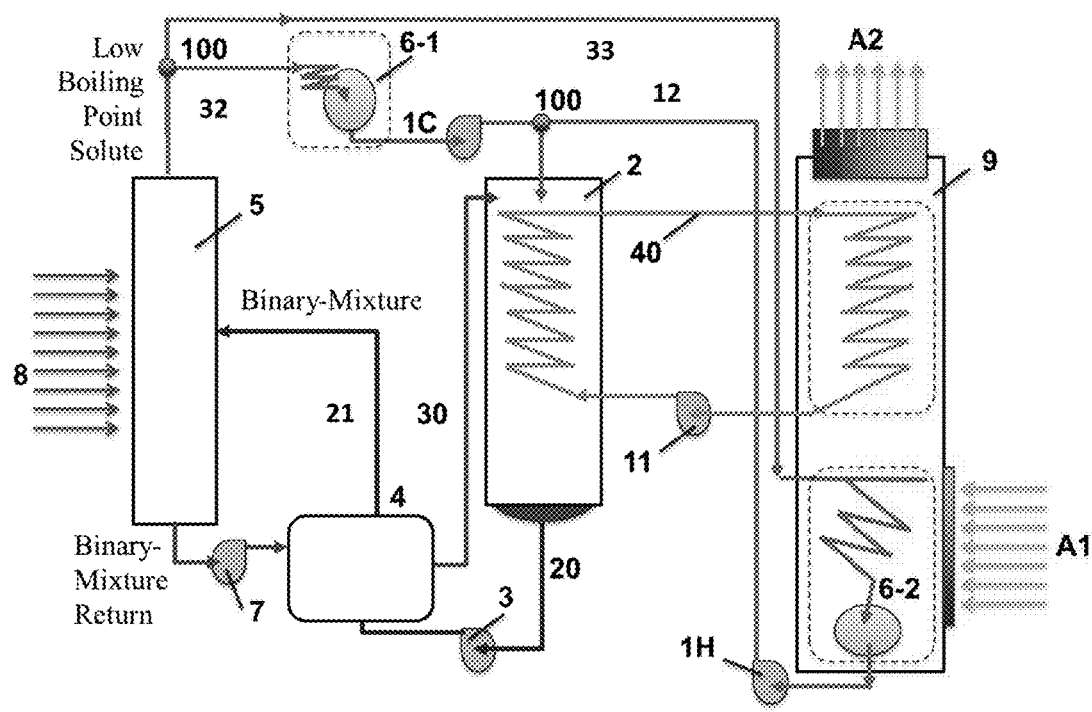
FIG. 3 is a schematic representation of an embodiment of the system of the present invention, used for selectively cooling and/or heating an environment.

For a heat pump as shown in FIG. 3, providing a selective heating and cooling system, the system may have one solvent and two solutes, wherein the solutes have different boiling points (at least 10° C. difference), and both are lower than the solvent boiling point by at least 10° C. This system includes two condensers 6-1, 6-2, one for each of the solutes, with one condenser 6-1 intended to condense and store the solute intended for cooling, and another condenser 6-2 (intended to condense and store the solute intended for the heating system) housed in the air handler 9. The system further includes two control valves 100 to direct the right solute to and from the condensers 6-1, 6-2, by means of lines 32, 33 and 12, respectively, depending on whether a cooling or a heating operation is selected, and two pumps 1C, 1H, each being associated with a condenser to deliver solute to the mixing heat exchanger 2.

The operation of the system of the present invention may be coupled to a room thermostat that will signal the pumps 1, 3, 7, 11 and the air handler fan 9A to start or stop, depending on the actual and the desired temperature of the room, as measured and set at the thermostat.

Integral to design of the system of the present invention is the choice of solute(s) and solvent. The solute(s) and the solvent should be selected so that the solute has a lower boiling point than that of the solvent (at least 10° C., but above the normal practical operating temperature of the mixing heat exchanger 2). The greater the differences between the boiling point of the solute(s) and that of the solvent will allow them to be easily separated in the system of the present invention. Furthermore, the solute and solvent should be selected to have large positive or negative enthalpy change of solution. For heating this enthalpy change may be between −10 kJ/mol and −200 kJ/mol; for cooling this enthalpy change may be between 5 kJ/mol and 30 kJ/mol. Examples of solutes and solvents are provided in Table 1 for heating systems, and Table 2 for cooling systems.

TABLE 1

Examples of Binary Mixtures For Heating Application with Their Properties

| Solute | BP (° C.) | Solvent | BP (° C.) | $\Delta_{sol}H$ (kJ/mol) | Mixing Temperature (° C.) | ΔBP |
|---|---|---|---|---|---|---|
| Titanium tetrachloride | 136.4 | Tributyl phosphate | 289 | −161 | 25 | −152.6 |
| Tin tetrachloride | 205 | Tributyl phosphate | 289 | −130 | 25 | −84 |
| Bromine | 58.8 | Phosphorus sulfochloride | 125 | −99 | 25 | −66.2 |
| Titanium tetrachloride | 136.4 | s- octyl acetate | 211 | −97.1 | 23 | −74.6 |
| Piperidine (39.3) | 106 | Allyl isothiocynate | 148 | −92.1 | 17 | −42 |
| Butyl formate | 106 | Titanium tetrachloride | 136.4 | −55.7 | 23 | −30.4 |
| i- Amyl formate | 125 | Titanium tetrachloride | 136.4 | −54.8 | 23 | −11.4 |
| Ethyl formate | 54 | Tin tetrachloride | 205 | −38.1 | 17 | −151 |
| Ethyl acetate (35.2) | 77.1 | Tin tetrachloride | 205 | −34.1 | 17 | −127.9 |
| Arsenic trichloride | 130.2 | Dimethyl sulfoxide | 189 | −33.6 | 25 | −58.8 |
| i-Butyl acetate | 126 | Tin tetrabromide | 205 | −29.7 | 16 | −79 |
| Pyridine (40.2) | 115.2 | Propionic acid | 141 | −26.3 | 25 | −25.8 |
| Water | 100 | Triethylene glycol (79.2) | 288 | −21.3 | 25 | −188 |
| Ethylacetate (35.2) | 77.1 | Tin tetrabromide | 205 | −26 | 17 | −127.9 |
| Ethylene glycol dimethyl ether | 85 | Water | 100 | −23.4 | 25 | −15 |
| Butylamine (32.6) | 77 | Water | 100 | −19.1 | 25 | −23 |

TABLE 2

Examples of Binary Mixtures For Cooling Applications with Their Properties

| Solute | BP (° C.) | Solvent | BP (° C.) | $\Delta_{sol}H$ (kJ/mol) | Mixing Temperature (° C.) | ΔBP |
|---|---|---|---|---|---|---|
| Water (44.0) | 100 | Amyl acetate | 149 | 11.4 | 25 | −49 |
| Water (44.0) | 200 | Butyl acetate | 117 | 10.2 | 25 | −17 |
| Nitroethane (41.6) | 114 | Cyclohexane | 80.74 | 10.5 | 25 | 33.26 |
| Thiazole | 117 | Cyclohexane | 80.74 | 10.5 | 25 | 36.26 |
| Cyclopentanol (57.8) | 139 | Cyclohexane | 80.74 | 19.5 | 25 | 58.26 |
| i-Propyl alcohol (45.6) | 82.5 | i-Octane | 99 | 22 | 25 | −16.5 |
| Perfluoro-n-heptane (36.4) | 83 | i-Octane | 99 | 11.3 | 25 | −16 |
| Ethyl alcohol (42.6) | 78.37 | Nonane | 150 | 25.1 | 30 | −71.63 |
| Acetone (30.8) | 56 | Cyclohexane | 80.74 | 10.3 | 20 | −24.74 |
| Ethyl alcohol (42.6) | 78.37 | Heptane | 98.42 | 25.1 | 30 | −20.05 |
| N,N-Diethylformamide | 177.6 | Cyclohexane | 80.74 | 11.5 | 25 | 96.86 |
| N,N-Dimethylacetamide | 165 | Cyclohexane | 80.74 | 12.7 | 25 | 84.26 |
| N,N-Dimethylpropionamide | 175 | Cyclohexane | 80.74 | 11.5 | 25 | 94.26 |
| N-Methylpyrrolidone | 204.3 | Cyclohexane | 80.74 | 10.9 | 25 | 123.56 |
| Propyl alcohol (47.5) | 97 | Dodecane | 214 | 24.5 | 30 | −117 |
| Hexane (31.6) | 67 | Furfural | 162 | 10 | 27 | −95 |
| Acetone (30.8) | 56 | Hexadecane | 271 | 10.5 | 25 | −215 |
| Heptane (36.6) | 98.42 | N,N-Dimethylformamide | 153 | 11.3 | 25 | −54.58 |
| Methyl alcohol (37.4) | 65 | Benzene | 80.1 | 14.6 | 25 | −15.1 |
| Ethyl alcohol (42.6) | 78.37 | Bromobenzene | 156 | 16.7 | 25 | −77.63 |
| Methyl alcohol (37.4) | 65 | Carbon tetrachloride | 76.72 | 18.7 | 20 | −11.72 |
| Ethyl alcohol (42.6) | 78.37 | Dichloroethyl ether | 178.2 | 10 | 25 | −99.83 |
| Octane (41.5) | 125 | Dichloroethyl ether | 178.2 | 10.5 | 25 | −53.2 |
| Propyl alcohol (47.5) | 97 | Dichloroethyl ether | 178.2 | 11.3 | 25 | −81.2 |
| Butyl alcohol (52.3) | 118 | Ethylbenzene | 136 | 16.7 | 25 | −18 |
| i-Propyl alcohol (45.6) | 82.5 | Ethylbenzene | 136 | 17.6 | 25 | −53.5 |
| Propyl alcohol (47.5) | 97 | Ethylbenzene | 136 | 14.6 | 25 | −39 |
| t-Butyl alcohol (47.7) | 82 | Heptane | 98.42 | 27.3 | 30 | −16.42 |
| t-Butyl alcohol (47.7) | 82 | Hexadecane | 271 | 15.7 | 30 | −189 |

TABLE 2-continued

Examples of Binary Mixtures For Cooling Applications with Their Properties

| Solute | BP (° C.) | Solvent | BP (° C.) | $\Delta_{sol}H$ (kJ/mol) | Mixing Temperature (° C.) | $\Delta BP$ |
|---|---|---|---|---|---|---|
| t-Butyl alcohol (47.7) | 82 | i-Octane | 99 | 23.8 | 30 | −17 |
| i-Propyl alcohol (45.6) | 82.5 | Toluene | 110.6 | 18 | 25 | −28.1 |
| Methyl alcohol (37.4) | 65 | Toluene | 110.6 | 13.2 | 25 | −45.6 |

The invention claimed is:

1. A thermally driven, environmental control unit comprising:

a mixing heat exchanger, a fractionator/evaporator column and a condenser, the fractionator/evaporator column and the condenser being in a closed fluid-flow, non-pressurized circuit with the mixing heat exchanger;

a solute and a solvent that the control unit is configured to mix to produce a binary mixture and an enthalpy change, wherein the control unit is further configured to have the solute and solvent fed to the mixing heat exchanger and mixed to produce the enthalpy change in the mixing heat exchanger, wherein the solute and the solvent are selected so that the boiling point of the solute is at least 10° C. lower than the boiling point of the solvent;

a liquid loop coupled with the mixing heat exchanger and an air handler to provide warm or cool supply air, wherein the control unit is configured so that:

a liquid is circulated within the liquid loop, through the mixing heat exchanger; and heat is exchanged between the liquid in the liquid loop and the binary mixture in the mixing heat exchanger; and the control unit is further configured wherein:

the binary mixture is supplied to the fractionator/evaporator column, separating the solute as a vapor from the solvent, the solvent is returned to the mixing heat exchanger; and the solute vapor is supplied to the condenser to condense the solute vapor into a liquid form of solute, and subsequently returned to the mixing heat exchanger.

2. The thermally driven, environmental control unit of claim 1, further comprising a first pump between the condenser and the mixing heat exchanger; a second pump between the mixing heat exchanger and the fractionator/evaporator column; and a third pump between the fractionator/evaporator column and the mixing heat exchanger.

3. The thermally driven, environmental control unit of claim 1, wherein the fractionator/evaporator column is coupled with a heat source, providing heat to the fractionator/evaporator column at temperatures higher than the boiling point of the solute but lower than the boiling point of the solvent.

4. The thermally driven, environmental control unit of claim 3, wherein the heat source is waste heat, solar heat, electric heat or fuel combustion heat.

5. The thermally driven environmental control unit of claim 1, wherein the enthalpy change produced by the mixing of the solute and the solvent is between −200 kJ/mol to 30 kJ/mol.

6. The thermally driven, environmental control unit of claim 1, further comprising a heat recovery heat exchanger between the evaporator and the mixing heat exchanger to exchange heat between the solvent from the evaporator and the binary mixture from the mixing heat exchanger.

7. The thermally driven environmental control unit of claim 2, further comprising a fourth pump pumping the liquid through the liquid loop.

8. The thermally driven environmental control unit of claim 1, wherein heat is exchanged between the liquid circulating through the liquid loop and air moving through the air handler.

* * * * *